(12) United States Patent
Yang et al.

(10) Patent No.: US 10,296,208 B2
(45) Date of Patent: May 21, 2019

(54) METHOD OF ADJUSTING AN EQUALIZER AND ELECTRONIC DEVICE PERFORMING THE SAME

(71) Applicant: Unlimiter MFA Co., Ltd., Eden Island (SC)

(72) Inventors: Kuo-Ping Yang, Taipei (TW); Neo Bob Chih-Yung Young, Taipei (TW); Kuan-Li Chao, Taipei (TW); Jian-Ying Li, Taipei (TW); Po-Jui Wu, Taipei (TW); Chih-Long Chang, Taipei (TW)

(73) Assignee: UNLIMITER MFA CO., LTD., Eden Island (SC)

( * ) Notice: Subject to any disclaimer, the term of this patent is extended or adjusted under 35 U.S.C. 154(b) by 401 days.

(21) Appl. No.: 15/184,236

(22) Filed: Jun. 16, 2016

(65) Prior Publication Data
US 2017/0293462 A1    Oct. 12, 2017

(30) Foreign Application Priority Data

Apr. 12, 2016 (TW) .............................. 105111399 A

(51) Int. Cl.
| | |
|---|---|
| *H03G 3/00* | (2006.01) |
| *H03G 5/00* | (2006.01) |
| *G06F 3/0488* | (2013.01) |
| *G06F 3/0484* | (2013.01) |

(52) U.S. Cl.
CPC ...... *G06F 3/04883* (2013.01); *G06F 3/04847* (2013.01); *G06F 3/04886* (2013.01); *G06F 2203/04808* (2013.01)

(58) Field of Classification Search
CPC .. H04R 3/04; H04R 2430/03; H03H 21/0012; H03H 21/0043; H03G 5/165; H03G 9/025; H03G 5/025; H04S 7/307
USPC .......................................... 381/98, 101–103
See application file for complete search history.

(56) References Cited

U.S. PATENT DOCUMENTS

| | | | | |
|---|---|---|---|---|
| 2006/0015198 A1* | 1/2006 | Okabayashi | ......... | G10H 1/0091 700/94 |
| 2010/0284528 A1* | 11/2010 | Bongiovi | .......... | H04L 25/03012 379/207.16 |
| 2012/0148053 A1* | 6/2012 | Tan | ........................ | G10K 15/02 381/1 |
| 2015/0281853 A1* | 10/2015 | Eisner | .................. | H04R 25/505 381/312 |

* cited by examiner

*Primary Examiner* — George C Monikang
(74) *Attorney, Agent, or Firm* — Bacon & Thomas, PLLC

(57) ABSTRACT

A method of adjusting an equalizer is disclosed. The method is applied to an electronic device for adjusting a plurality of gain values of the equalizer synchronously. The method of adjusting an equalizer of the present invention includes the steps of receiving an adjusting command; increasing or decreasing each of the gain values synchronously in an equimultiple way; storing adjusted gain values in a memory of the electronic device.

10 Claims, 7 Drawing Sheets

METHOD OF ADJUSTING AN EQUALIZER AND ELECTRONIC DEVICE PERFORMING THE SAME

BACKGROUND OF THE INVENTION

1. Field of the Invention

The present invention relates to a method of adjusting an equalizer; more particularly, the present invention relates to a method of synchronously adjusting each of a plurality of gain values set by the equalizer.

2. Description of the Related Art

An "equalizer" is a sound adjustment tool which is used for adjusting gain values of sounds at individual frequency bands. By means of adjusting the gain values of sounds at different frequencies, the audio effect of an output sound can be altered. For example, an explosion sound played with increased bass output would provide a more shocking and vivid audio experience. Conventionally gain value settings of an equalizer are mostly adjusted by a user adjusting the gain value at a single frequency band, or multiple pre-installed modes are provided for the user to perform adjustment by selecting different modes. Conventionally, there is no method of increasing or decreasing the gain values at each of the frequency bands synchronously in an equimultiple way.

Therefore, there is a need to provide a method of adjusting an equalizer and an electronic device performing the same to mitigate and/or obviate the aforementioned problems.

SUMMARY OF THE INVENTION

It is an object of the present invention to provide a method of adjusting an equalizer capable of synchronously adjusting each of a plurality of gain values set by the equalizer, and to provide an electronic device for performing the abovementioned method.

To achieve the abovementioned objects, the method of adjusting an equalizer is applied to an electronic device. The electronic device comprises a screen and a memory. The memory contains an original equalizer. The original equalizer is recorded with $1^{st}$~$N^{th}$ gain values, wherein the $1^{st}$~$N^{th}$ gain values are gain values at different frequencies, and $2 \leq N \leq 1,000$. The method of adjusting an equalizer of the present invention comprises the following steps: receiving an adjusting command for modifying the original equalizer; increasing or decreasing the $1^{st}$~$N^{th}$ gain values synchronously in an equimultiple way to form a new equalizer, wherein the new equalizer is recorded with $1^{st}$~$N^{th}$ new gain values; and storing the new equalizer in the memory.

The electronic device for performing the abovementioned method of adjusting an equalizer comprises a screen, a memory and a processor. The memory contains an original equalizer. The original equalizer is recorded with $1^{st}$~$N^{th}$ gain values, wherein the $1^{st}$~$N^{th}$ gain values are gain values at different frequencies, and $2 \leq N \leq 1,000$. The processor is electrically connected to the screen and the memory. The processor is used for receiving an adjusting command for modifying the original equalizer; after receiving the adjusting command, the processor further increases or decreases the $1^{st}$~$N^{th}$ gain values synchronously in an equimultiple way to form a new equalizer and contains the new equalizer in the memory, wherein the new equalizer is recorded with new $1^{st}$~$N^{th}$ gain values.

Other objects, advantages, and novel features of the invention will become more apparent from the following detailed description when taken in conjunction with the accompanying drawings.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
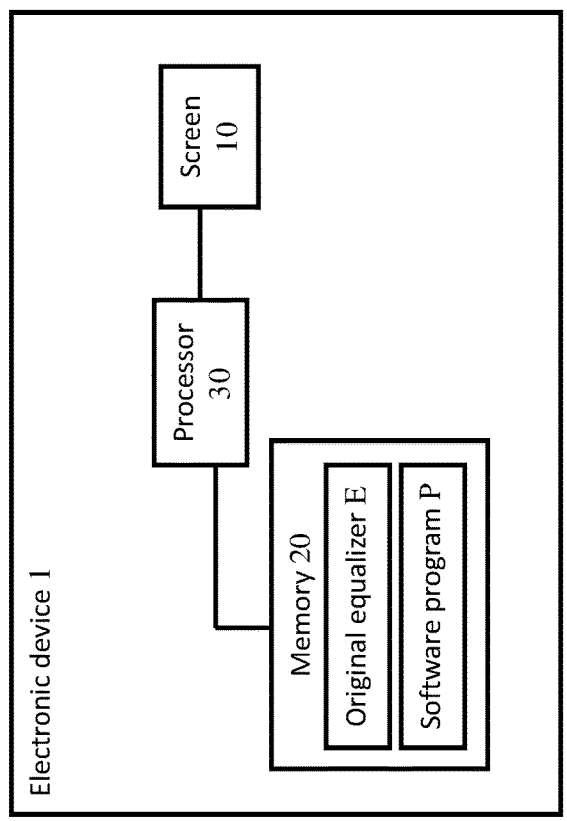
FIG. 1 illustrates a structural drawing of an electronic device according to the present invention.
Figure 2:
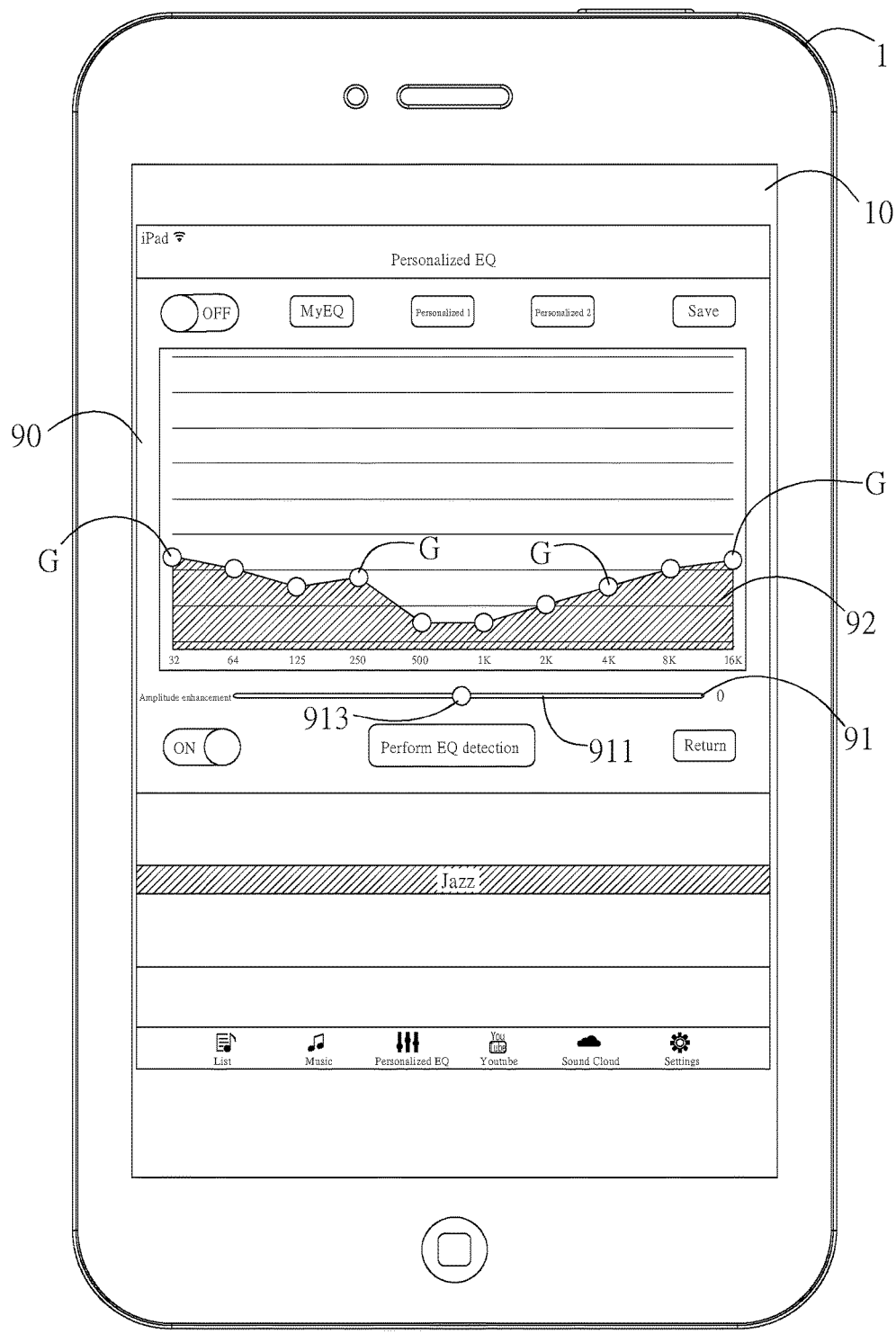
FIG. 2 illustrates a schematic drawing of a user interface according to a first embodiment of the present invention.
Figure 3:
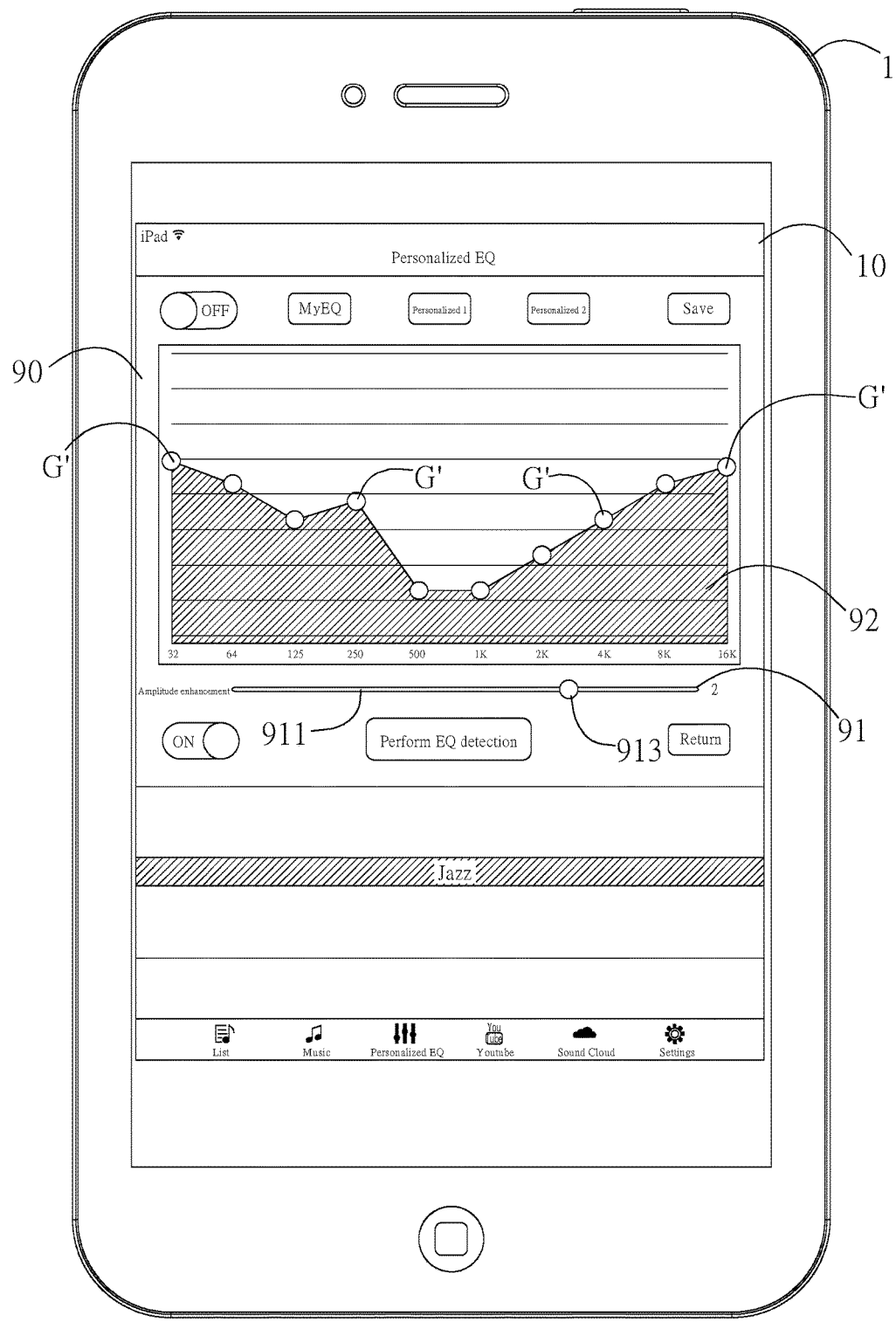
FIG. 3 illustrates a schematic drawing of a user increasing gain values synchronously in an equimultiple way by adjusting an adjustment bar according to the present invention.
Figure 4:
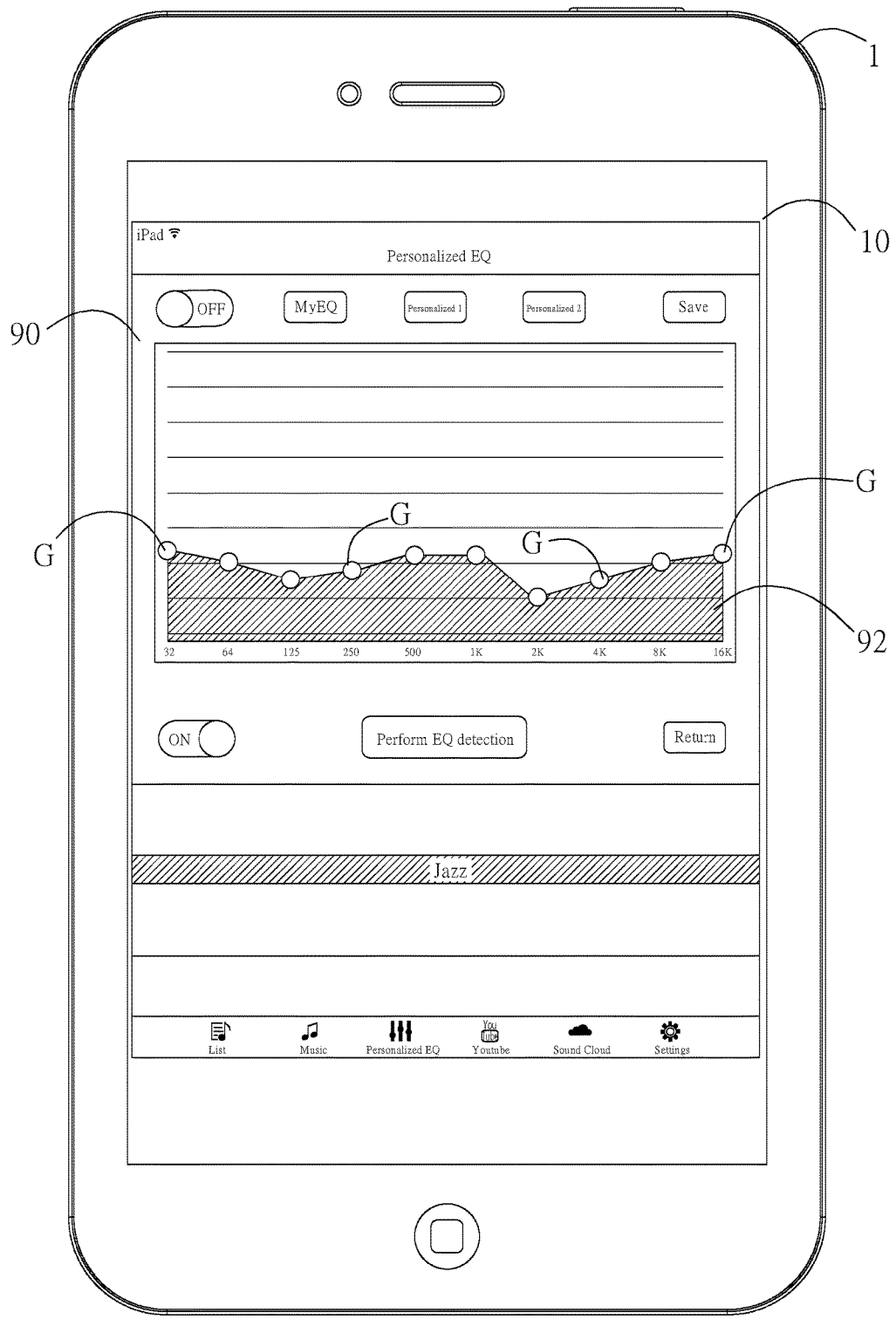
FIG. 4 illustrates a schematic drawing of a user interface according to a second embodiment of the present invention.
Figure 5:
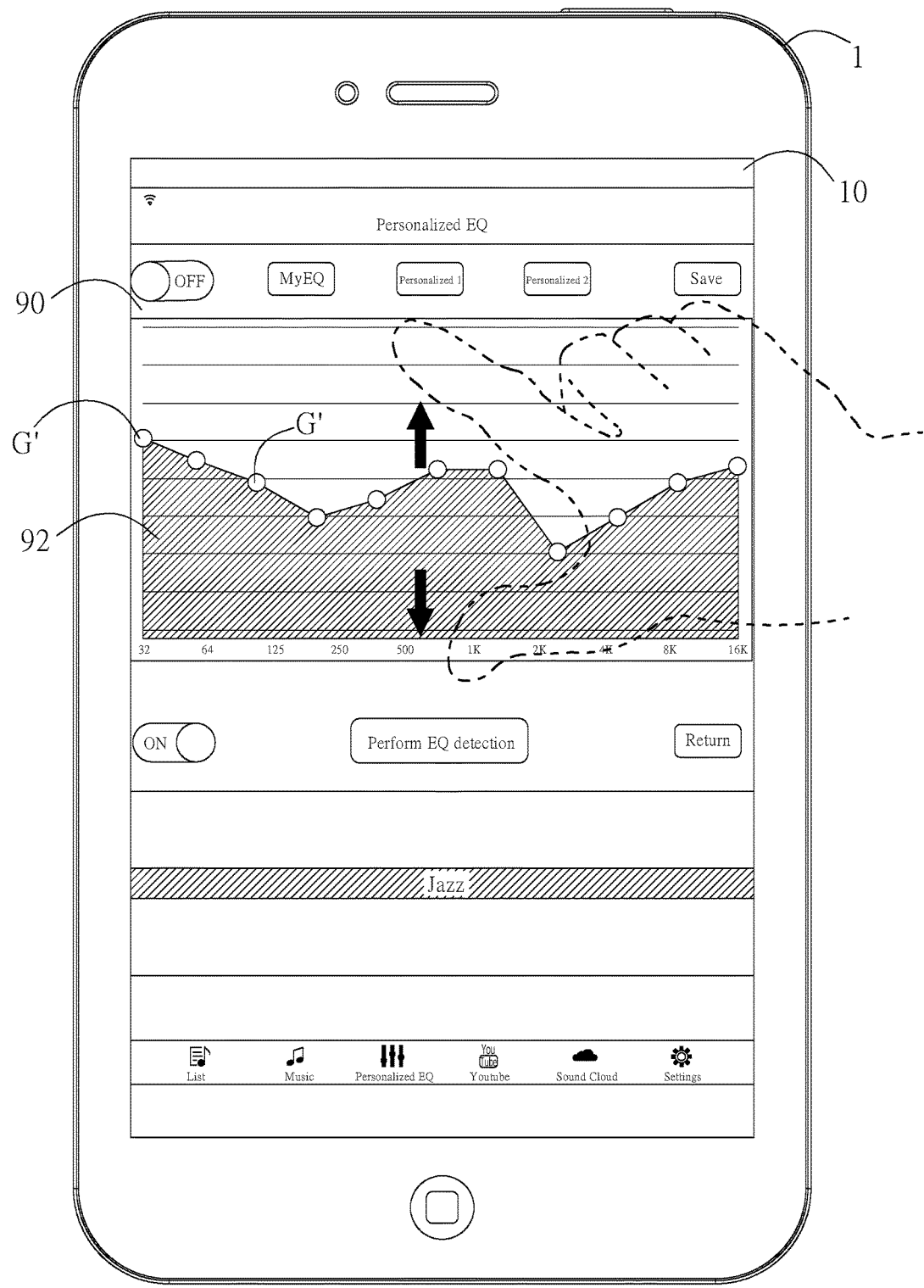
FIG. 5 illustrates a schematic drawing of a user increasing gain values synchronously in an equimultiple way by performing a dual touch gesture operation according to the present invention.
Figure 6:
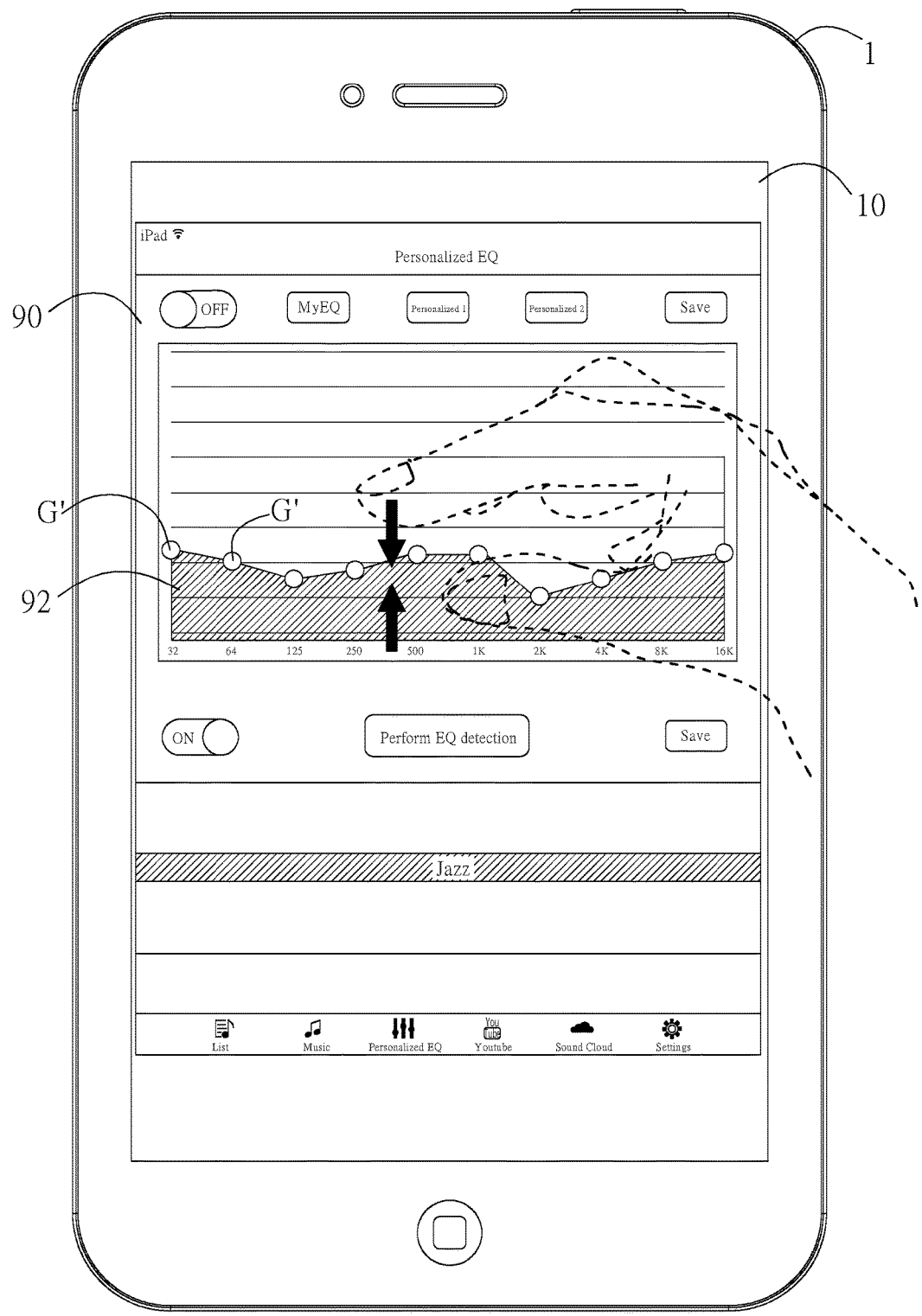
FIG. 6 illustrates a schematic drawing of a user decreasing gain values synchronously in an equimultiple way by performing a dual touch gesture operation according to the present invention.

Please refer to FIG. 1 to FIG. 6, wherein. FIG. 1 illustrates a structural drawing of an electronic device according to the present invention; FIG. 2 illustrates a schematic drawing of a user interface according to a first embodiment of the present invention; FIG. 3 illustrates a schematic drawing of a user increasing gain values synchronously in an equimultiple way by adjusting an adjustment bar according to the present invention; FIG. 4 illustrates a schematic drawing of a user interface according to a second embodiment of the present invention; FIG. 5 illustrates a schematic drawing of a user increasing gain values synchronously in an equimultiple way by performing a dual touch gesture operation according to the present invention; and FIG. 6 illustrates a schematic drawing of a user decreasing gain values synchronously in an equimultiple way by performing a dual touch gesture operation according to the present invention.

As shown in FIG. 1, in one embodiment of the present invention, the electronic device 1 of the present invention comprises a screen 10, a memory 20 and a processor 30. The processor 30 is electronically connected to the screen 10 and the memory 20. In one embodiment of the present invention, the electronic device 1 is, but is not limited to, a smart phone. The electronic device 1 can also be a tablet computer, a laptop computer or other equivalent computer products equipped with similar computing functions.

The screen 10 can be used for displaying a user interface 90 as shown in FIG. 2 or FIG. 4. In one embodiment of the present invention, the screen 10 is, but is not limited to, a touch screen. The operations of the user interface 90 will be described in more detail hereinafter.

In one embodiment of the present invention, the memory 20 contains an original equalizer E and a software program P. After the processor 30 loads and executes the software program P, the method of adjusting an equalizer disclosed in the present invention can be performed accordingly. The functions implemented by means of using the processor 30 to perform the method of adjusting an equalizer of the present invention will be described in more detail hereinafter.

Figure 7:
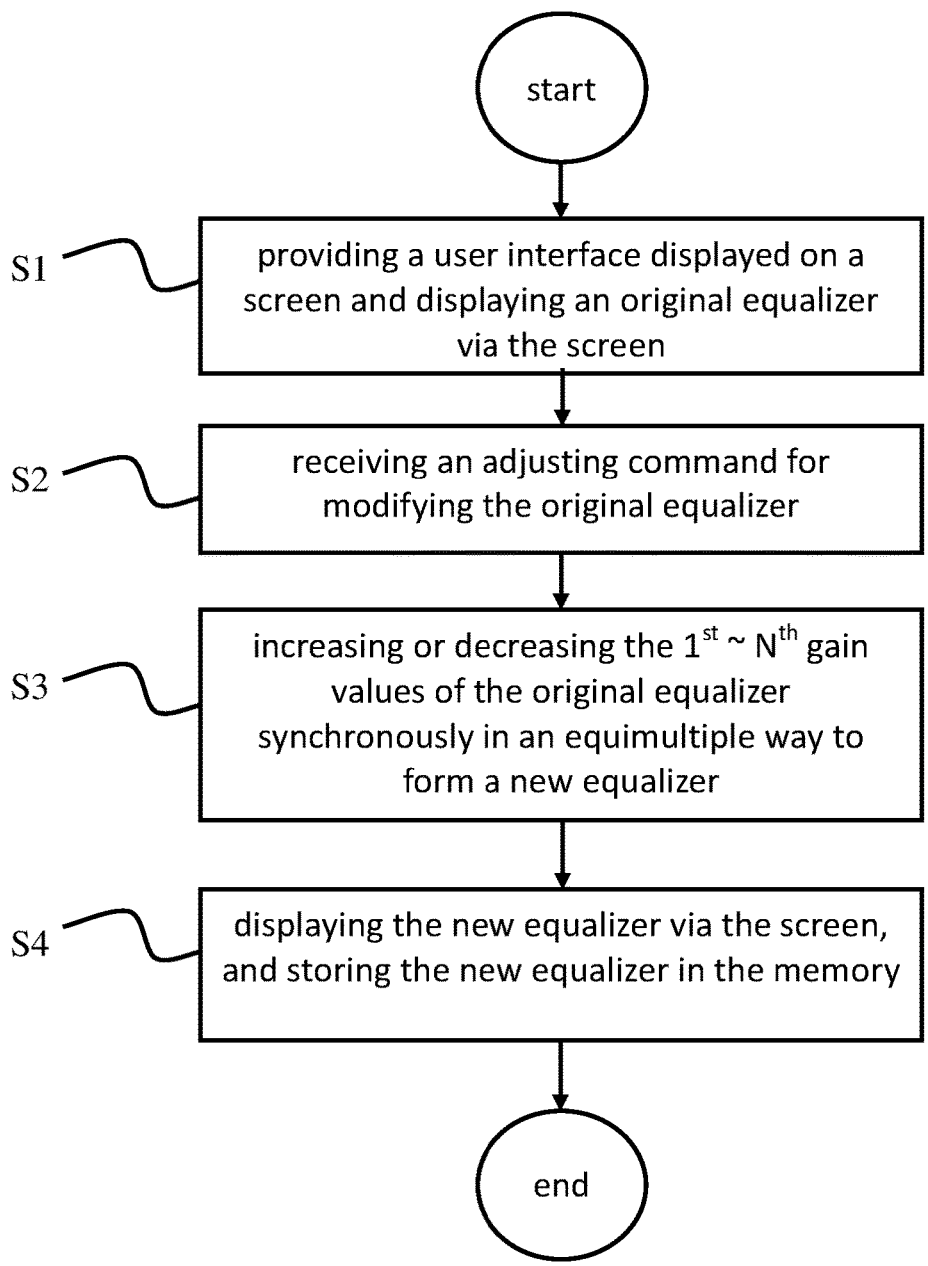
FIG. 7 illustrates a flowchart of a method of adjusting an equalizer according to the present invention.

Next, please refer to FIG. 1 to FIG. 7, wherein FIG. 7 illustrates a flowchart of the method of adjusting an equalizer according to the present invention. Steps disclosed in FIG. 7 will be explained sequentially by referring to FIG. 1 to FIG. 6. Please note that the scope of the method of adjusting an equalizer disclosed in the present invention is not limited to application to the abovementioned electronic device 1.

First, the method performs step Si: providing a user interface displayed on a screen and displaying an original equalizer via the screen.

In the first embodiment of the present invention, if the user wants to adjust the settings of the equalizer of the electronic device 1, the user can input a request command by means of operating the electronic device 1. Preferably, without limiting the scope of the present invention, a specific pattern can be displayed on the screen 10 for the user to click and input the request command. Once the user inputs the request command to the electronic device 1, the processor 30 of the electronic device 1 will receive the request command and provide a user interface 90 for being displayed on the screen 10 according to the request command, and the currently-stored original equalizer E will be displayed on the screen 10 in a graphic way.

In a first embodiment of the present invention, the user interface 90 comprises an adjustment bar 91 and an equalizer image 92. The adjustment bar 91 includes an indicator bar 911 and an adjustment point 913. The adjustment point 913 is located on the indicator bar 911 and can move along the indicator bar 911 according to the user's operation. The equalizer image 92 is used for representing the settings of gain values of the original equalizer E. In one embodiment of the present invention, the original equalizer E is recorded with $1^{st}$~$10^{th}$ gain values G, wherein the $1^{st}$~$10^{th}$ gain values G are gain values G at different frequencies (in this embodiment, the frequencies are, but are not limited to, 32, 64, 125, 250, 500, 1,000, 2,000 4,000 8,000 and 16,000 Hz). The original equalizer E can be recorded with $1^{st}$~$N^{th}$ gain values, wherein $2 \leq N \leq 1,000$.

Step S2: receiving an adjusting command for modifying the original equalizer.

In the first embodiment of the present invention, when the screen 10 of the electronic device 1 displays the user interface 90, the user can input an adjusting command for modifying the original equalizer E by means of moving the adjustment point 913 along the indicator bar 911 (as shown in FIG. 3). After the adjusting command is inputted, the processor 30 will receive the adjusting command.

Step S3: increasing or decreasing the $1^{st}$~$N^{th}$ gain values of the original equalizer synchronously in an equimultiple way to form a new equalizer.

After performing step S2, the processor 30 will then increase or decrease the $1^{st}$~$10^{th}$ gain values G of the original equalizer E synchronously in an equimultiple way so as to form a new equalizer.

For example, as shown in FIG. 2, if the user moves the adjustment point 913 from the center position to the right on the indicator bar 911, the adjusting command is being inputted. The inputting of the adjusting command causes the processor 30 to increase each of the gain values G of the original equalizer E synchronously in an equimultiple way according to the adjusting command, wherein an adjustment ratio will be determined according to a displacement distance of the adjustment point 913. As an example, assuming that moving the adjustment point 913 to the rightmost position of the indicator bar 911 can increase each of the gain values G by 4 times the original gain values G, then moving the adjustment point 913 to the middle position between the rightmost position and the center position of the indicator bar 911 will increase each of the gain values G by 2 times the original gain values G. Furthermore, if the user moves the adjustment point 913 to the left to input the adjusting command, the processor 30 will decrease the $1^{st}$~$10^{th}$ gain values G of the original equalizer E synchronously in an equimultiple way so as to form the new equalizer.

Finally, the method performs step S4: displaying the new equalizer via the screen and storing the new equalizer in the memory.

After performing step S3, the processor 30 will display the new equalizer formed after the adjustment via the screen 10. The new equalizer is recorded with $1^{st}$~$10^{th}$ new gain values G', which are respectively M times the $1^{st}$~$10^{th}$ gain values G of the original equalizer E, wherein $1/3,0000 \leq M \leq 3,000$ (as shown in the embodiment of FIG. 3, M=2). In one preferred embodiment, the maximum ratio of increasing the gain values and that of decreasing the gain values are equal, i.e., the maximum ratios are both 4 times the gain values, without limiting the scope of the present invention. Finally, the processor 30 will store the new equalizer in the memory 20.

As shown in FIG. 4, the difference between a second embodiment and the first embodiment of the present invention is that the user interface 90 in the second embodiment is not provided with the adjustment bar 91; only the equalizer image 92 is provided. In this embodiment, the adjusting command disclosed in the abovementioned step S2 is inputted by the user performing a dual touch gesture operation on the equalizer image 92 (as shown in FIG. 5 and FIG. 6). As shown in FIG. 5, if the user performs a zoom-in gesture on the equalizer image 92 to input the adjusting command (as shown in FIG. 5), the processor 30 will increase each of the gain values G of the original equalizer E synchronously in an equimultiple way according to the adjusting command so as to form the new equalizer. Conversely, if the user performs a zoom-out gesture on the equalizer image 92 to input the adjusting command (as shown in FIG. 6), the processor 30 will decrease the $1^{st}$~$10^{th}$ gain values G of the original equalizer E synchronously in an equimultiple way according to the adjusting command so as to form the new equalizer. In this embodiment, the mechanism of adjusting the ratio depends on the travel distance of two fingers of the user. Because the dual touch gesture operation is known to those skilled in the art and has been widely discussed in many patents and technical reports, there is no need for further description.

Please note that in other embodiments, the user interface 90 can be designed for allowing the user to input the adjusting command via either the adjustment bar 91 or the dual touch gesture operation. Furthermore, the method of inputting the adjusting command of the present invention is not limited to the above two embodiments; it is also possible to display the increasing/decreasing ratios as selection options for the user to select and input.

Although the present invention has been explained in relation to its preferred embodiments, it is to be understood that many other possible modifications and variations can be made without departing from the spirit and scope of the invention as hereinafter claimed.

What is claimed is:

1. A method of adjusting an equalizer, applied to an electronic device, the electronic device comprising a screen and a memory, wherein the memory contains an original equalizer, the original equalizer being recorded with $1^{st}$~$N^{th}$ gain values, wherein the $1^{st}$~$N^{th}$ gain values are gain values at different frequencies, and $2 \leq N \leq 1,000$, the method of adjusting an equalizer comprising the following steps:

providing a user interface displayed on the screen;

receiving an adjusting command imputted by a user operating the interface for modifying the original equalizer;

increasing or decreasing the $1^{st}$~$N^{th}$ gain values synchronously in an equimultiple way to form a new equalizer according to the adjusting command, wherein the new equalizer is recorded with $1^{st}$~$N^{th}$ new gain values; and storing the new equalizer in the memory.

2. The method of adjusting an equalizer as claimed in claim 1, wherein the $1^{st}$~$N^{th}$ new gain values are M times the $1^{st}$~$N^{th}$ gain values, respectively, and $1/30,000 \leq M \leq 3,000$.

3. The method of adjusting an equalizer as claimed in claim 2, further comprising the following step executed before the step of receiving the adjusting command: displaying the original equalizer via the screen; and the following step executed after the step of forming the new equalizer: displaying the new equalizer via the screen.

4. The method of adjusting an equalizer as claimed in claim 1, wherein the user interface comprises an indicator bar and an adjustment point, the adjustment point being located on the indicator bar, wherein the adjusting command is inputted by the user moving the position of the adjustment point on the indicator bar.

5. The method of adjusting an equalizer as claimed in claim 1, wherein the screen is a touch screen, and the user interface can be operated by means of a touch control operation, wherein the adjusting command is inputted by the user performing a dual touch gesture operation.

6. An electronic device, comprising:

a screen;

a memory, containing an original equalizer, the original equalizer being recorded with $1^{st}$~$N^{th}$ gain values, wherein the $1^{st}$~$N^{th}$ gain values are gain values at different frequencies, and $2 \leq N \leq 1,000$; and a processor, electrically connected to the screen and the memory, used for providing a user interface on the screen and receiving an adjusting command inputted by a user operating the interface for modifying the original equalizer, the processor further increasing or decreasing the $1^{st}$~$N^{th}$ gain values synchronously in an equimultiple way to form a new equalizer according to the adjusting command and storing the new equalizer in the memory, wherein the new equalizer is recorded with $1^{st}$~$N^{th}$ new gain values.

7. The electronic device as claimed in claim 6, wherein the $1^{st}$~$N^{th}$ new gain values are M times the $1^{st}$~$N^{th}$ gain values, respectively, and $1/30,000 \leq M \leq 3,000$.

8. The electronic device as claimed in claim 7, wherein the processor is further used for displaying the original equalizer via the screen before receiving the adjusting command and displaying the new equalizer via the screen after forming the new equalizer.

9. The electronic device as claimed in claim 6, wherein the user interface comprises an indicator bar and an adjustment point, the adjustment point being located on the indicator bar, wherein the adjusting command is inputted by the user moving the position of the adjustment point on the indicator bar.

10. The electronic device as claimed in claim 6, wherein the screen is a touch screen, and the user interface can be operated by means of a touch control operation, wherein the adjusting command is inputted by the user performing a dual touch gesture operation.

* * * * *